J. STANO.
AUTOMOBILE DIRECTION INDICATOR AND WHEEL ANGLE GAGE.
APPLICATION FILED MAY 16, 1921.
1,391,701.
Patented Sept. 27, 1921.
2 SHEETS—SHEET 1.
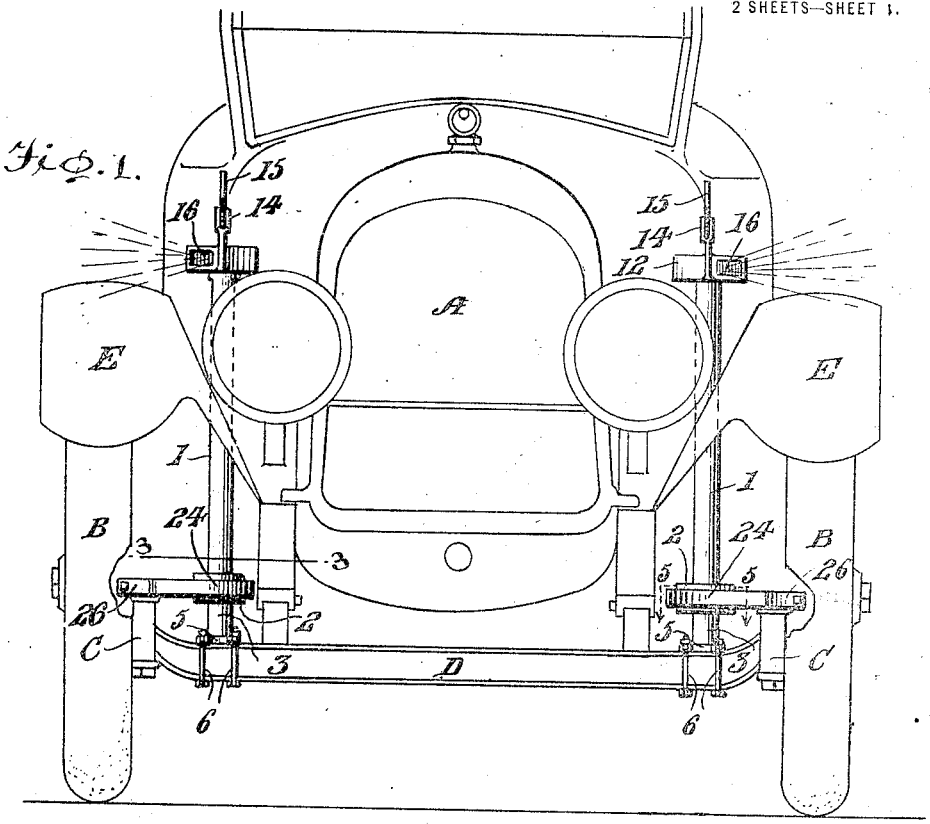
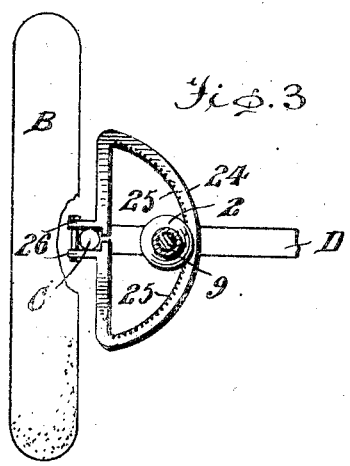
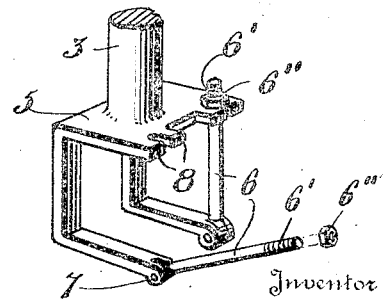
Inventor
J. Stano,
By H. K. Bryant
Attorney

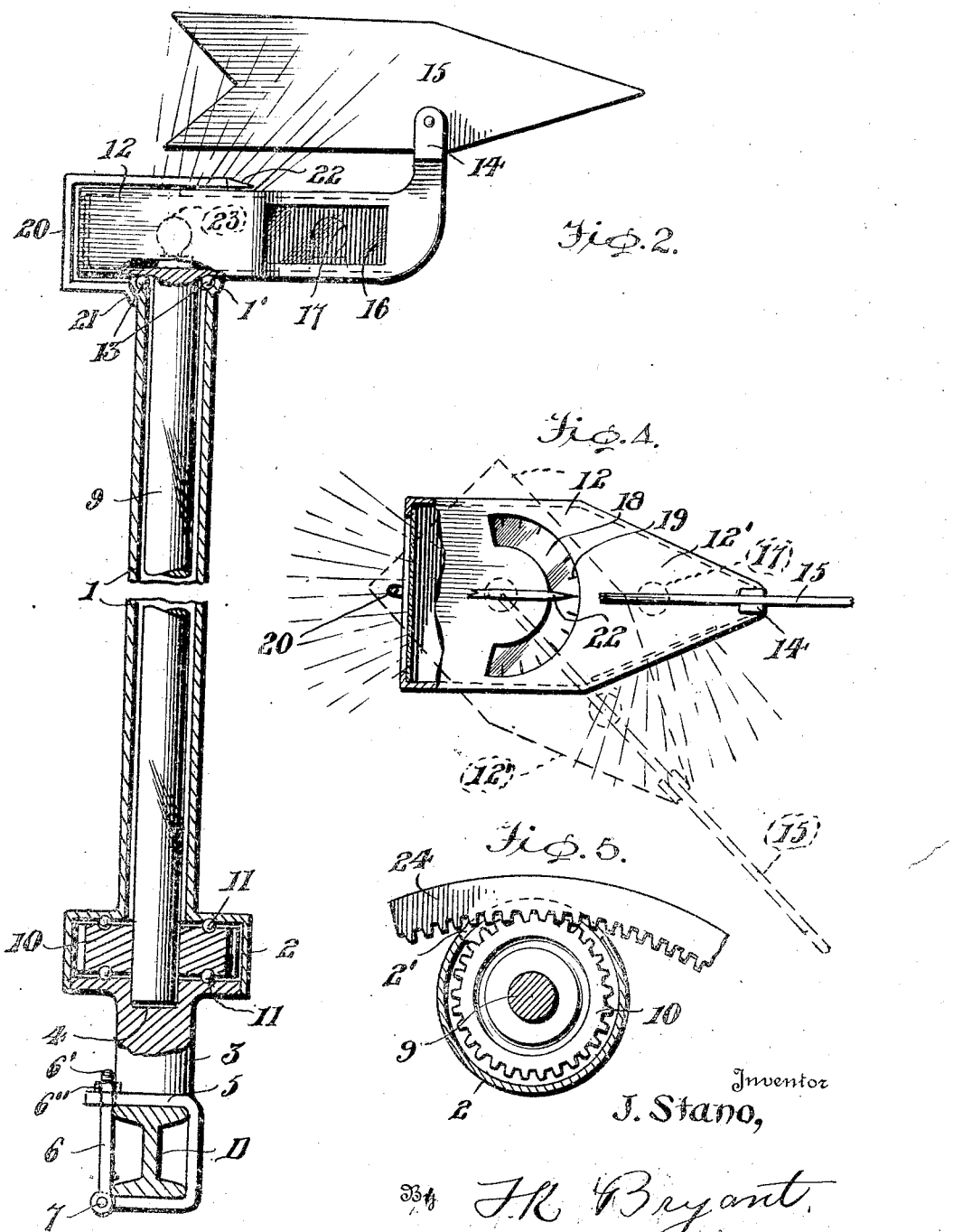

UNITED STATES PATENT OFFICE.

JOHN STANO, OF LIVINGSTON, ILLINOIS.

AUTOMOBILE DIRECTION-INDICATOR AND WHEEL-ANGLE GAGE.

1,391,701. Specification of Letters Patent. Patented Sept. 27, 1921.

Application filed May 16, 1921. Serial No. 470,032.

*To all whom it may concern:*

Be it known that I, JOHN STANO, a citizen of Czecho-Slovakia, residing at Livingston, in the county of Madison and State of Illinois, have invented certain new and useful Improvements in Automobile Direction-Indicators and Wheel-Angle Gages, of which the following is a specification.

This invention relates to certain new and useful improvements in automobile direction indicators and wheel angle gages.

The primary object of the present invention resides in the provision of a direction indicator for automobiles wherein an indicator arm is positioned at each side of an automobile engine hood adjacent the front end thereof and operatively connected to the steering knuckles of the front wheels of the automobile to be turned in the desired direction to indicate the change in travel of the automobile.

A further object of the invention has reference to a gage for determining the angular positions of the front wheels of an automobile when the same has been parked, certain regulations requiring that the wheels be positioned at a certain angle relative to a parking line, the gage being associated with a direction indicator for determining the direction of travel of an automobile.

With the above general objects in view and others that will appear as the nature of the invention is better understood, the same consists in the novel form, combination and arrangement of parts hereinafter more fully described in connection with, the accompanying drawings, and in which like reference characters indicate corresponding parts throughout the several views.

In the drawings,

Figure 1 is a front elevational view of an automobile partly broken away equipped with the present form of direction indicator and wheel angle gage.

Fig. 2 is a vertical sectional view of the direction indicator and wheel angle gage showing the same mounted upon the chassis frame of an automobile, Fig. 3 is a horizontal sectional view taken on line III—III of Fig. 1 showing the connection between the direction indicator and the steering knuckle of an automobile.

Fig. 4 is a top plan view, partially in section of the indicator head and wheel knuckle gage showing the same by dotted lines in its shifted position, Fig. 5 is a fragmentary horizontal sectional view taken on line V—V of Fig. 1 showing the gear carried by the rotatable indicator shaft engaging the rack segment attached to the steering knuckle and Fig. 6 is a fragmentary perspective view of the clamp of the indicator for securing the same to the automobile chassis.

Briefly described, the present invention aims to provide in a single structure, a direction indicator for automobiles and a wheel-angle gage. The direction indicator embodies a pair of duplicate members positioned at opposite sides of the automobile engine hood and having a base support secured to the forward cross rail of the chassis. The indicator includes a tubular casing having a vertical shaft journaled therein and carrying a fixed gear projecting through an open side of the casing for engagement with an arcuate rack that is connected to the steering knuckle of the automobile. The upper end of the shaft carries a casing head containing illuminating means and is fashioned to support a direction arrow. The upper face of the casing head is graduated and has coöperating therewith, an indicator finger fixed to the tubular casing inclosing the rotatable shaft, to indicate the angularity of the indicator arrow and the corresponding angularity of the front wheels of the automobile.

Referring more in detail to the accompanying drawings and particularly to Fig. 1, there is illustrated an automobile indicator by the reference character A having forward wheels B, steering knuckles C and a forward transverse chassis rail D with a mud guard E associated with each wheel B.

The direction indicator and wheel angle gage embodies a perpendicular tubular casing 1 having an annular enlargement 2 adjacent the lower end thereof with the lower end of the casing 1 formed with a solid post 3 having a socket 4 in the upper end thereof communicating with the annular enlargement 2 with the post 3 supported on the chassis rail D at each side of the automobile with the tubular casing 1 extending upwardly through the guards E.

The mounting of the base post 3 upon the chassis rail D is shown more clearly in Figs. 1, 2, and 6, the mounting for the post 3 and tubular casing 1 embodying a U-shaped clamp 5 having strap bars 6 hinged to one open side thereof as at 7 with the free ends of the strap bars threaded as at 6' and adapted to be moved into apertured lugs 8 and there retained by clamping nuts 6″ as shown in Fig. 6, this clamp securely mounting the tubular casing 1 and base post 3 upon the chassis rail D.

A perpendicular rod 9 is rotatably mounted within the tubular casing 1 with the lower end thereof extending into the upper socket 4 of the base post 3, said rod 9 having secured thereto within the annular enlargement 2 of the casing 1, a gear 10 with antifriction bearing pawls 11 spacing the gear from the walls of the enlargement 2. The upper end of the rod 9 carries a casing head 12 overlying the tubular casing 1 while the upper end of the tubular casing is spun outwardly as at 1′ to receive bearing balls 13 to space the casing head from the tubular casing 1.

The casing head is of the form best illustrated in Figs. 2 and 4, the same tapering toward its outer end as at 2′ with an upstanding bracket 14 carried by the outer end of the tapered portion for supporting an arrow head 15, the outer side wall of the tapered portion of the casing head being provided with a glass cover opening 16 with a lamp 17 positioned within the casing for reflecting light rays through the glass plate 16 which may be of the desired color, such as white or red.

The wheel angle gage is best illustrated in Figs. 2 and 4 and embodies the formation of an arcuate slot in the upper wall of the casing head 12 that is covered by a glass plate 18 provided with graduations 19. An indicator arm 20 U-shaped in side elevation as shown in Fig. 2 is secured at one end as at 21 to the upper end of the tubular casing 1, the indicator arm inclosing the rear end of the casing head 12 with the forward pointed end 22 thereof coöperating with the graduations 19 upon the glass 18. A lamp 23 positioned in the casing head 12 reflects light rays through the glass plate 18 to provide for an easy reading at night time of the graduated plate 19.

The operating mechanism for the direction indicator and wheel angle gage is shown more clearly in Figs. 1, 3, and 5, a semi-circular rack bar 24 having teeth upon the inner face thereof being provided with cordal arms 25 having brackets 26 to be secured to the steering knuckle C of the automobile, the semi-circular rack 24 inclosing the annular enlargement 2 of the tubular casing 1 and extending through a side opening slot 2′ in the annular enlargement for engagement with the gear 10.

From the above detailed description, it will be understood that the turning movement of the wheels 45 in either direction will cause the rack bars 24 to rotate the gears 10 upon the rods 9 at each side of the automobile with a consequent shifting movement of the casing heads 12 with the direction arrows 15 carried thereby, the arrows determining the change in direction of travel of the automobile. Certain parking regulations require that the front wheels of an automobile be positioned at specific angles with reference to a parking line and the angularity of the wheels 13 is readily determined by the indicator arm 20 coöperating with the graduated plate 18 as shown in Fig. 4, the operator of the automobile being in a position to clearly read the gage and assisted during night by the lamp 23.

While there is herein shown and described the preferred embodiment of the present invention, it is nevertheless to be understood that minor changes may be made in the novel form, combination and arrangement of parts without departing from the spirit and scope of the invention as claimed.

What is claimed as new is:

1. An automobile direction indicator and wheel angle gage comprising a tubular casing adapted to be secured to a chassis bar of the automobile, a rod journaled in said casing, coöperative connections between said rod and the steering knuckles of the automobile, a direction indicator and wheel angle gage carried by the upper end of the tubular casing and rod, said direction indicator and wheel angle gage embodying a hollow casing head fixed to the upper end of said rod and overlying the tubular casing, a bracket carried by the casing head, an arrow head carried by said bracket, an arcuate dial upon the upper face of said casing head and an indicator arm carried by said tubular casing and overlying said casing head to coöperate with said dial.

2. An automobile direction indicator and wheel angle gage comprising a tubular casing adapted to be secured to a chassis bar of the automobile, a rod journaled in said casing, coöperative connections between said rod and the steering knuckles of the automobile, a direction indicator and wheel angle gage carried by the upper end of the tubular casing and rod, said direction indicator and wheel angle gage embodying a hollow casing head fixed to the upper end of said rod and overlying the tubular casing, a bracket carried by the casing head, an arrow head carried by said bracket, an arcuate dial upon the upper face of said casing head, an indicator arm coöperating with said dial, and a U-shaped indicator arm fixed to said tubular casing and inclosing the rear end of said casing head with the upper end thereof extending over said casing head for coöperation with said dial.

In testimony whereof I affix my signature in presence of two witnesses.

JOHN STANO.

Witnesses:
 JOHN LABANC,
 LUKES BOZIK.